July 21, 1964 S. WOLF 3,141,360
GUIDED ELECTRIC DRILL
Filed Feb. 18, 1963
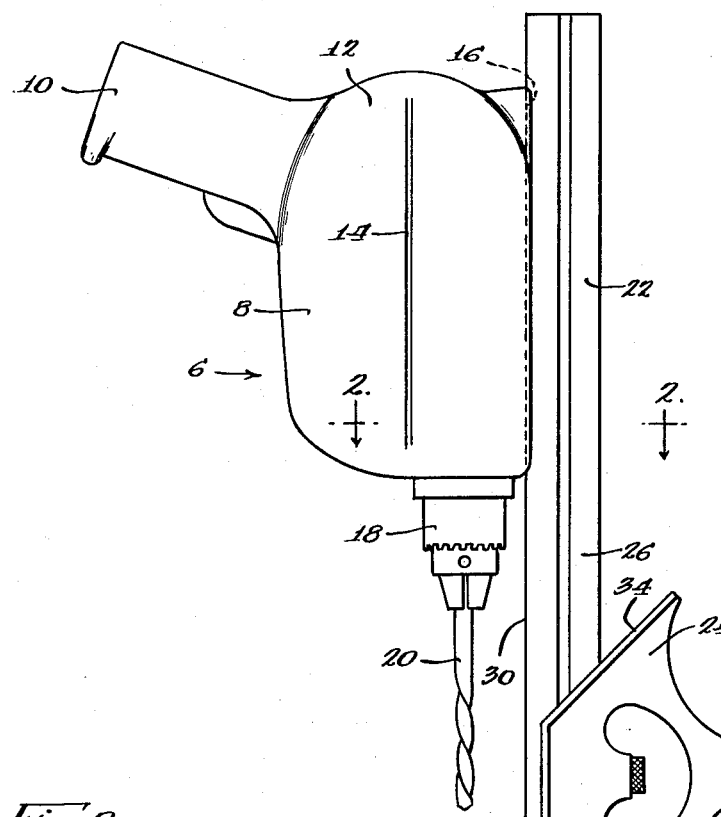
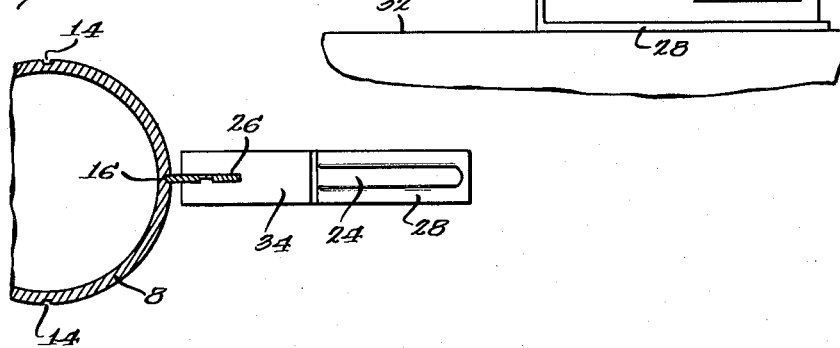
INVENTOR.
Samuel Wolf
BY
Wupper, Gradolph & Love
attys United States Patent Office 3,141,360
Patented July 21, 1964

3,141,360
GUIDED ELECTRIC DRILL
Samuel Wolf, Rte. 1, Box 66, Spring Grove, Ill.
Filed Feb. 18, 1963, Ser. No. 259,126
3 Claims. (Cl. 77—7)

My invention relates to a guided electric drill and more specifically to an electric drill arranged for the accurate sinking of holes, etc. perpendicularly into a surface.

It is notoriously difficult to sink a hole in, for instance, a wooden plank or surface freehand with an electric drill with any reasonably close approach to perpendicularity. The operator of the drill can estimate the perpendicularity of the drill or the bit with fair accuracy in the plane transversely to his line of sight, but is unable to make any good estimate in the plane aligned with his sighting eye. As he fixes the drill in the one plane and moves his head around to view the drill in the other plane, the nature of human control is such that the drill will be carried out of its first established position.

My invention has for its principal object an exceedingly simple and inexpensive provision in an electric drill whereby, when used in conjunction with a square, holes may be drilled or other operations performed perpendicularly to a surface with a high degree of accuracy.

My invention may also be used to maintain a drill at any other angle within wide limits to a flat surface for the performance of many desired operations.

Other objects and advantages of my invention will be apparent from the following description and drawings of which:

FIG. 1 is a side elevation of an electric drill incorporating my invention shown in conjunction with a combination square in operative relation for perpendicular hole drilling; and FIG. 2 is a section taken along the line 2—2 of FIG. 1 looking in the direction of the arrows.

My invention is very easily described. It consists of providing grooves in the case of a drill having sides and bottoms exactly parallel to the drill bit. In FIG. 1, I show a drill 6 having a case 8. The case includes a handle 10 and a barrel 12, the latter containing the motor and mounting the chuck 18 at its forward end. The barrel is formed with side grooves 14 and a top groove 16 therein having straight sides and bottoms, as stated, exactly parallel to the axis of the chuck 18 of the drill or to the axis of a bit 20 contained in the chuck.

FIG. 1 also illustrates a combination square 22 having a head 24 and a blade 26. The head has a foot 28 and provision for containing the blade so that the outside edge 30 of the blade is exactly perpendicular to the foot 28. The foot is commonly about two and a half inches long and about three quarters of an inch wide. The blade is about a sixteenth of an inch thick.

The grooves 14 and 16 should be such that they fit closely but easily slidably on the edge of the blade of the square. They need be only deep enough so that the drill is engaged positively. I contemplate a depth in the vicinity of a sixteenth of an inch. The sides of the grooves may be wide enough to afford substantial relief to the blade of the square and insure easy sliding. Conventional drill cases permit a groove length of at least two inches which is sufficient bearing to hold the drill accurately in spite of some looseness of the blade within the groove. I suggest one of the grooves 16 be on top of the drill and the other two grooves 14 be on the sides thereof, the grooves 14 run out at their ends, as illustrated, because of the rounding of the end surfaces of the drill case 12.

The operation of my device will be readily appreciated from the foregoing description and drawings. The point of the drill bit 20 is placed on the point of entry into the workpiece 32, the foot 28 of the square is placed flat on the workpiece, the straight edge of the square is brought up into engagement with one of the grooves 14 or 16 on the drill case, and the drill then operated, at the same time being held snugly against the blade 22 of the square.

The combination square illustrated may provide sufficient guidance for the drill without any need for visual assistance. The drill will be well restrained from any angular wandering in one plane by virtue of the two and a half inch length of the foot 28 of the head 24, and the three-quarter inch width of the foot will provide moderately good support for the drill against wandering in the transverse plane.

It will be appreciated that the difficulty in drilling exactly perpendicularly lies in the difficulty of maintaining an accurate relation from two aspects at right angles to each other; maintaining the relation in only one aspect is not difficult. Therefore, even if the foot of the square afford not too stable a guide in the transverse plane, that plane can be the one determined visually.

For instance, if a plane is to be drilled into a vertical surface below the eye level of the operator, perpendicularity can be determined by eye successfully in the side-to-side orientation. If the square then is engaged in the top groove 16 in the drill, the drill will be well supported against improper orientation in the up-and-down orientation and a good hole can be sunk.

I have shown my invention in conjunction with a combination square. It will be appreciated that it may be used with equal success in conjunction with a try square and with nearly equal success in conjunction with a carpenter square. The carpenter square lacks the width of foot characterizing the other two sorts of squares but, as pointed out, visual sighting is effective as long as it need concern itself with only one plane.

It will be further appreciated that holes may be drilled or other work performed at predetermined angles with the drill of my invention. The illustrated head of the combination square has also a 45° foot 34. The head may be reversed on the blade or run to the other end of the blade and that 45° foot used as the bearing surface on the workpiece. In such case, the drill, following the blade edge, will drill a hole inclined 45° to the working surface. Combination squares are often provided with protractor heads. These may be employed to provide a blade edge 30 at any desired degree to the working surface and the drill run along that edge to drill a hole at a corresponding angle. In such case, one of the side grooves 14 will be employed to avoid interference from the foot of the protractor head.

The grooves 14 and 16 may, of course, be provided in the casing in the process of casting the case or may be machined therein thereafter. They may be provided, as illustrated, as slots in the otherwise continuous surface of the drill barrel or they may be provided as between two ridges on the barrel.

It will be appreciated, of course, that the grooves will be situated on the side or top surfaces of the drill so that the projection of the grooves at either end will be unobstructed. It is conventional that the drill casing extend radially sufficiently beyond the chuck to meet my purposes. Wherever a particular drill casing does not meet the qualifications for the practice of my invention, it may be easily reengineered to suitability.

Other alternatives in the practice of my invention will undoubtedly suggest themselves to those skilled in the art and I therefore desire that my invention be regarded as being limited only as set forth in the following claims.

I claim:
1. For use in drilling a hole in a flat working surface, the temporary combination of a portable electric drill having a chuck and a tool therein and a combination square having a blade with a straight edge and a foot of substantial width and length at right angles to said edge, the barrel of said drill having an unobstructed groove therein about one-sixteenth inch in width and having a depth approximately equal to its width over the greater portion of its length, said groove having straight sides and a bottom all parallel to the axis of said chuck, said groove engaging closely and slidably said edge of said square.

2. A portable electric drill having a case including a barrel portion and a chuck extending from said barrel portion, said barrel portion having an unobstructed groove therein having straight sides and a bottom all parallel to the axis of said chuck, said groove being about one-sixteenth inch in width and having a depth not appreciably greater than its width so as to receive closely and slidably the edge of the blade of a combination square.

3. A portable electric drill having a case including a barrel, a chuck extending from one end thereof, a handle extending from one side thereof, said barrel being radially outermost with respect to the axis of said chuck other than on the side from which said handle extends, and a groove on the side of said barrel opposite said handle and grooves on the sides of said barrel between said handle side and said opposite side, all of said grooves being exactly parallel to the axis of said chuck and relatively long and being about one-sixteenth inch in width and having a depth not appreciably greater than said width so as to receive closely and slidably therein the edge of the blade of a combination square.

References Cited in the file of this patent
UNITED STATES PATENTS

| | | |
|---|---|---|
| 1,510,219 | Harding | Sept. 30, 1924 |
| 2,165,334 | Bossi | July 11, 1939 |
| 2,837,939 | Leitner et al. | June 10, 1958 |
| 2,909,085 | Jepson | Oct. 20, 1959 |
| 3,100,408 | Pufahl | Aug. 13, 1963 |